United States Patent [19]
Bernett et al.

[11] Patent Number: 5,153,789
[45] Date of Patent: Oct. 6, 1992

[54] METHODS AND APPARATUS FOR OPTIMIZING TRACK SEEKING OPERATIONS

[75] Inventors: Frank Bernett; William Ray, both of Colorado Springs, Colo.

[73] Assignee: Digital Equipment Corporation, Maynard, Mass.

[21] Appl. No.: 543,973

[22] Filed: Jun. 26, 1990

[51] Int. Cl.⁵ .............................................. G11B 21/08
[52] U.S. Cl. .............................. 360/78.04; 360/77.02; 369/32; 369/43
[58] Field of Search .................... 360/60, 77.01–77.11, 360/78.01, 78.04–78.14; 369/32, 43, 44.25, 44.27–44.33, 53, 56, 58

[56] References Cited

U.S. PATENT DOCUMENTS

| | | | |
|---|---|---|---|
| 4,730,290 | 3/1988 | Takasago et al. | 369/32 |
| 4,839,751 | 6/1989 | Revels | 360/60 |

*Primary Examiner*—Aristotelis Psitos
*Assistant Examiner*—Steven R. Garland
*Attorney, Agent, or Firm*—Arnold, White & Durkee

[57] ABSTRACT

A method and apparatus for providing a dynamic fine track seeking operation that adaptively fine tunes the entrance criteria used to determine when the head is on track for the specific disc drive under actual operating conditions. The method and apparatus includes adaptively modifying entrance criteria individually for each head in a disc drive according to actual operating conditions with the use of stored entrance criteria for each head, an extra track proximity threshold and a successful entrance counter.

4 Claims, 5 Drawing Sheets

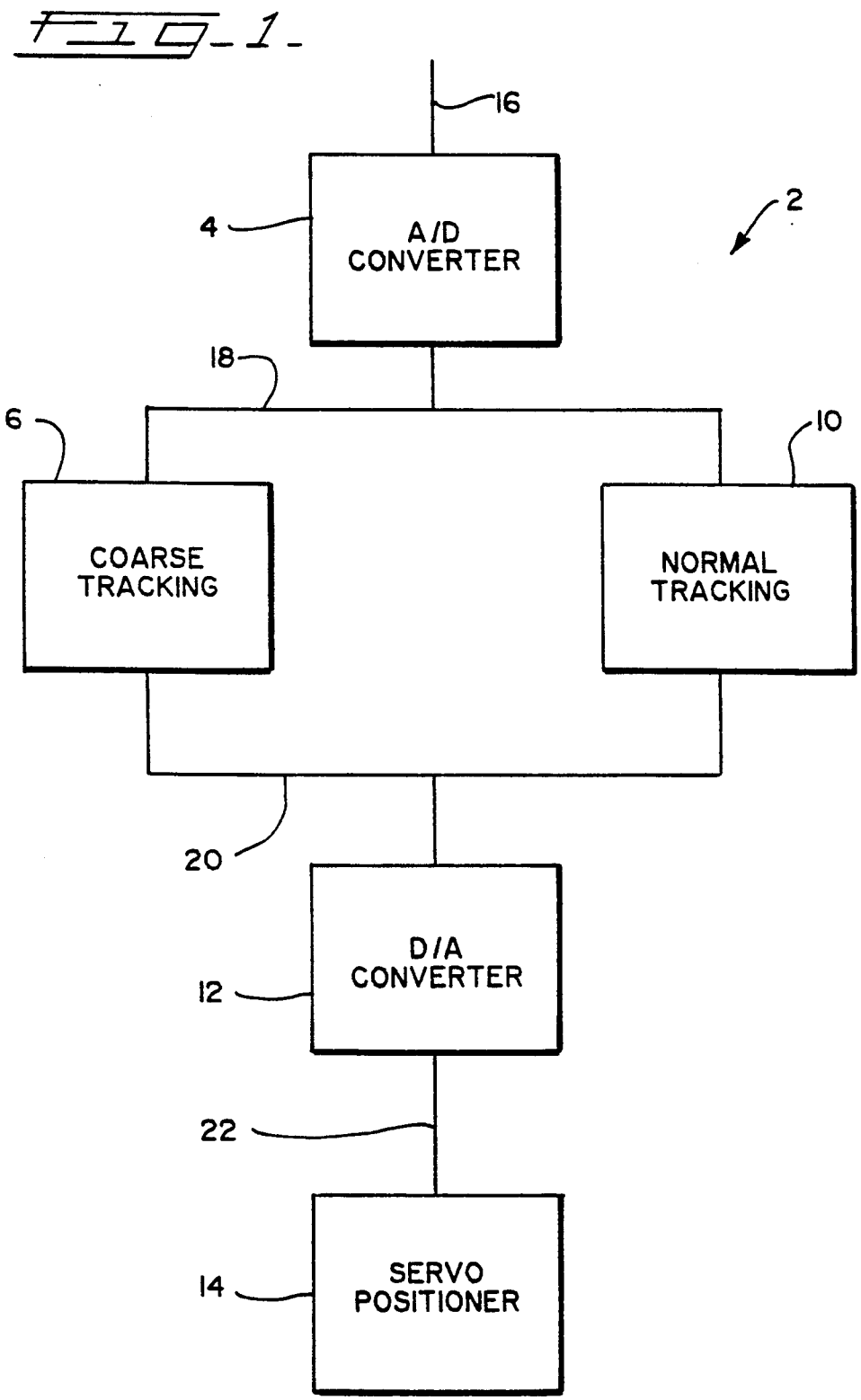

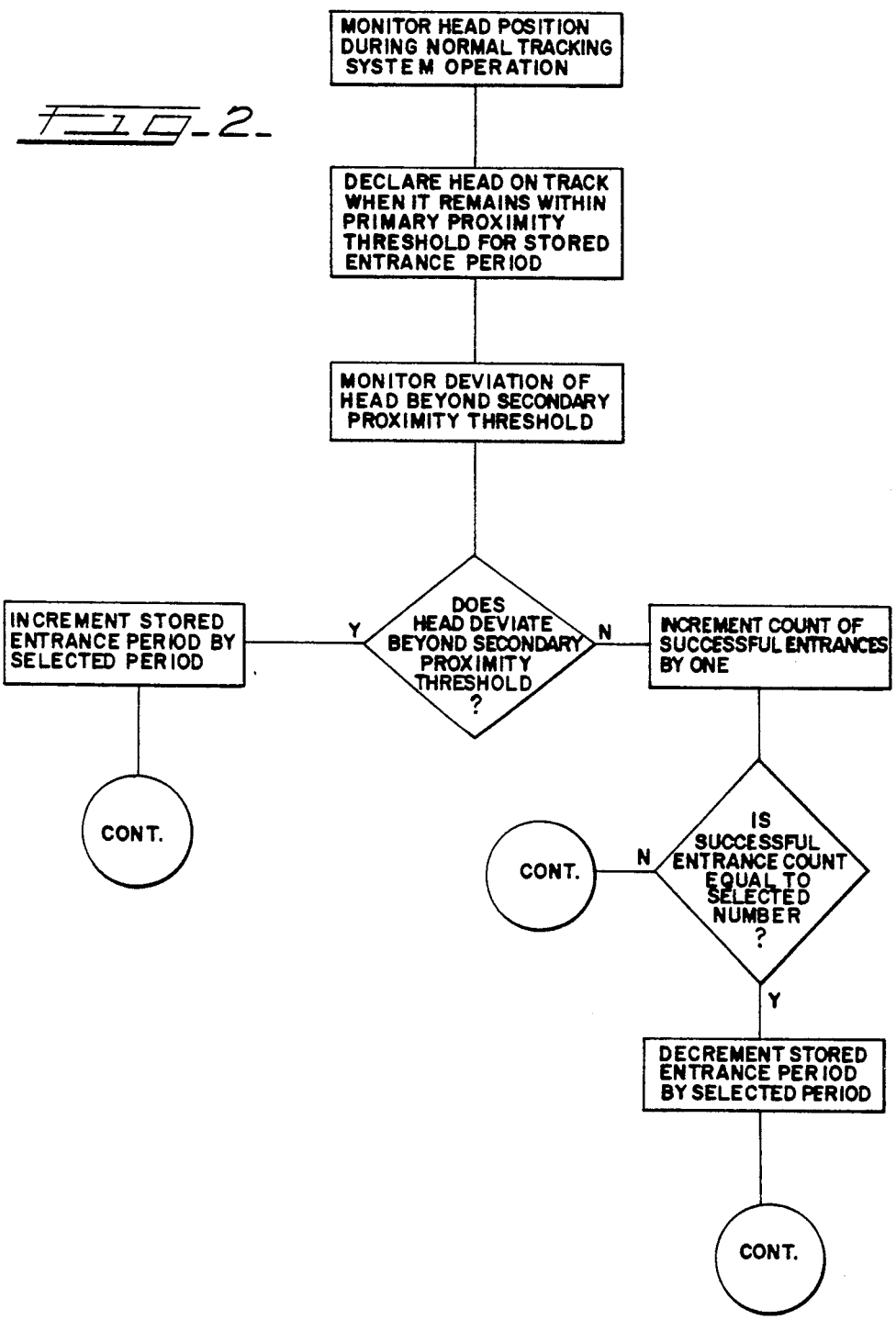

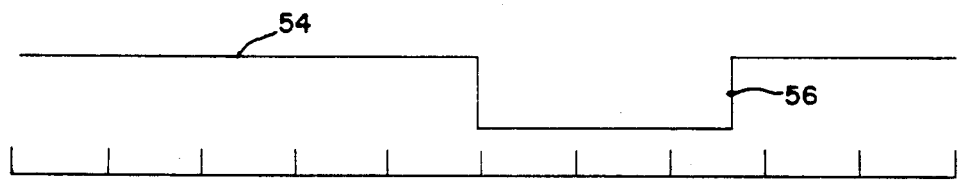
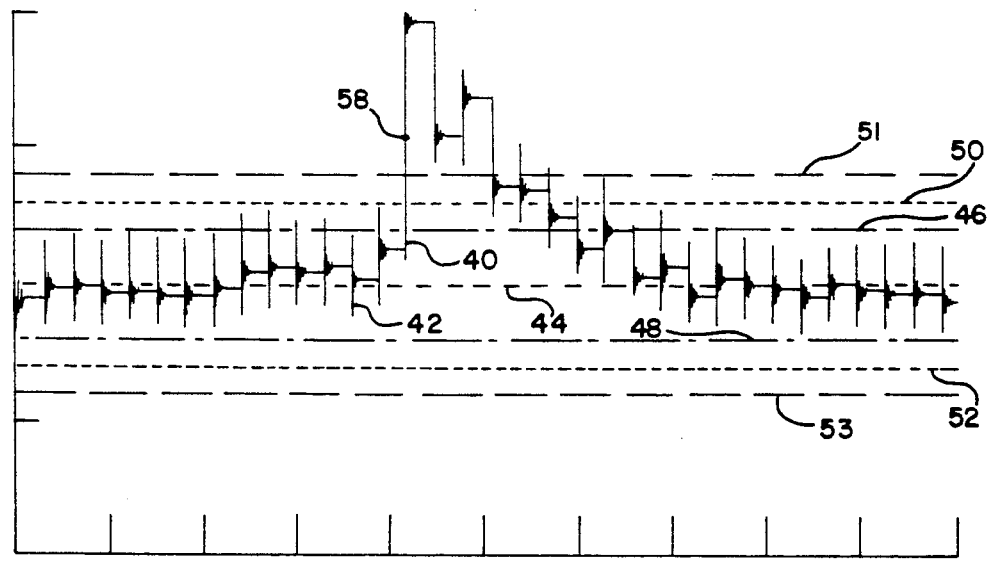

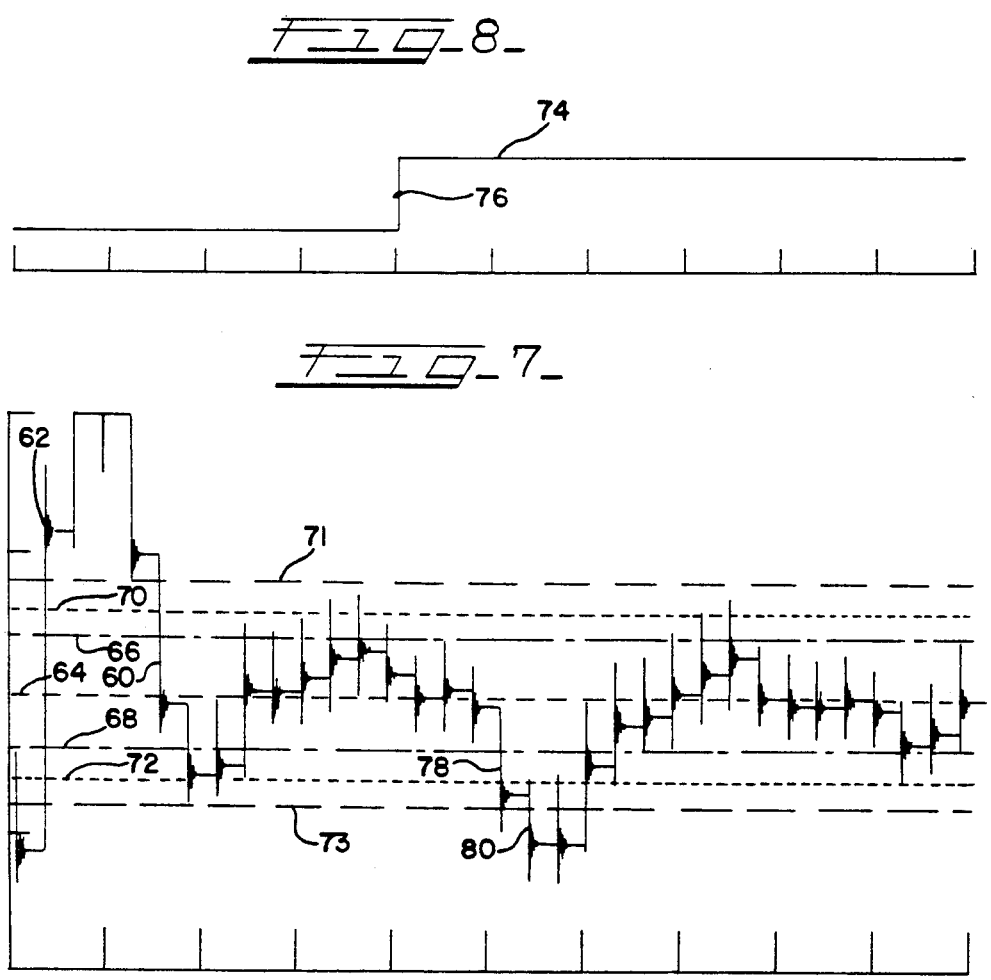

METHODS AND APPARATUS FOR OPTIMIZING TRACK SEEKING OPERATIONS

FIELD OF THE INVENTION

The present invention relates to track seeking operations for disc drives, and more particularly to methods and apparatus for controlling the track seeking servo system for a disc drive to provide optimal acquisition times for track seeking operations.

BACKGROUND OF THE INVENTION

Servo systems are used in disc drives for controlling the arm assembly to position a head on the arm assembly over a selected track of a disc. A "normal" tracking system is used to accurately maintain the head over the selected track.

When disc drives must change from one track to another selected track on the disc, it is important to accurately reposition the head over the newly selected track as quickly as possible to minimize the access time. The normal tracking system is not suitable for this purpose.

Most disc drives use a separate "coarse" track seeking system that takes over servo control from the normal tracking system to rapidly move the head into approximate alignment with the selected track. Once the head is so approximately positioned, the normal tracking system takes over servo control from the coarse track seeking system to accurately align the head precisely over the selected track.

Once the normal tracking system accurately positions the head over the newly selected head for a duration that is sufficient to prevent mistracking, the normal tracking system allows the drive to perform the read or write operation that it has been requested to do.

The normal tracking system has a "fine" track seeking operation that uses the proximity of the head to the centerline of the selected track to determine when the head has sufficiently settled on the selected track. The normal tracking system then declares the head to be on track when the head has remained within a selected proximity of the track centerline for a selected entrance period.

The entrance period is selected to insure that the head will remain accurately positioned on the selected track before the drive is allowed to read or write. For example, the entrance period may correspond to the period of a selected number of sectors on the selected track.

The criteria used by the normal tracking system to determine when the head is on track is referred to as the "fine" track entrance criteria. Normally, the fine track entrance criteria is set for a particular type of disc drive by empirically measuring a criteria for a sample of drives that is conservative enough to insure that any off-track or read errors cannot occur with any of the tested drives.

Because the selected fine track entrance criteria of the type described above must be conservative enough to protect the average disc drive against off-track and read errors under all operating conditions, optimal fine track seeking is not possible under normal conditions. That is, the duration of the number of track sectors selected for the entrance period is greater than necessary for normal operation. This causes a longer than necessary track acquisition period.

Among the factors that cause the selected criteria to be excessive for normal operation is the variation of stability from unit to unit of the heads used in the disc drives. Also, some arm assemblies are more susceptible to tracking problems during settling than others.

Furthermore, the environment in which the disc drives are used can seriously affect their track seeking characteristics. For instance, if the ambient temperature rises, the damping and stiffness of the shock mounts holding the head/disc assembly of the disc drive can change appreciably. This change in damping and stiffness adversely affects the track seeking characteristics of the tracking servo system during the settling portion of the seek operation.

One approach to adapting the disc drive entrance criteria to changes in ambient temperature is to add a selected time to the entrance period when a certain temperature is sensed. This approach helps prevent offtrack and read errors caused by temperature rise, but the resulting fine track seeking operations are still performed at a rate that is far from optimal.

SUMMARY OF THE INVENTION

The present invention eliminates the need for conservative fine track entrance criteria by providing a dynamic fine track seeking operation that adaptively fine tunes the entrance criteria for the specific disc drive under actual operating conditions. The present invention detects the entrance of the head within a narrow primary threshold of proximity from the centerline of the selected track for an initial entrance period according to an initially stored entrance criteria corresponding to the head in use to determine if the head is on track. This is done in a manner similar to the prior art, except that the criteria is optimized for average normal conditions, and different criteria are stored for each head.

The present invention then modifies the stored criteria for the head in use according to the number of entrances performed with or without deviation of the head beyond a secondary threshold of proximity from the centerline of the selected track. The secondary threshold is wider than the primary threshold, so that if the head crosses the secondary threshold after the head is declared on track, the stored entrance period for the head is increased to provide greater system stability for a subsequent entrance of the head.

The present invention also counts the number of consecutive entrances of the head without any deviation of the head beyond the secondary threshold of proximity. When this number equals a selected value, the entrance period is reduced to improve the track seeking acquisition time for a subsequent entrance of the head.

In this manner, the fine track entrance criteria for each head in the disc drive is modified to increase or decrease the entrance period according to actual operating conditions.

DESCRIPTION OF THE DRAWINGS

FIG. 1 is a block diagram of a tracking servo system suitable for incorporating the present invention.

FIG. 2 is a flow chart of the methodology of the present invention.

FIG. 5 is a graphical representation the analog position signal for a second example of a head entrance operation as a function of time.

FIG. 6 is a graphical representation of the tracking system fine track signal as a function of time for the second example of position signal shown in FIG. 5.

FIG. 7 is a graphical representation the analog position signal for a third example of a head entrance operation as a function of time.

FIG. 8 is a graphical representation of the tracking system fine track signal as a function of time for the third example of position signal shown in FIG. 7.

DETAILED DESCRIPTION OF THE PREFERRED EMBODIMENT

Figure 4:
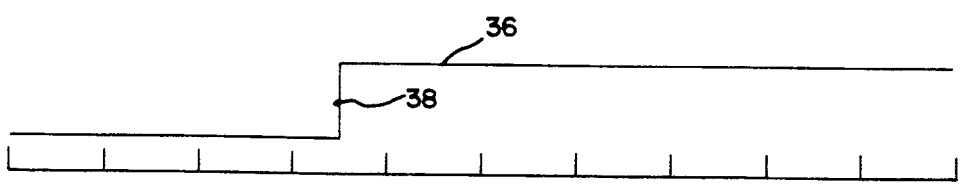
FIG. 4 is a graphical representation of the tracking system fine track signal as a function of time for the first example of position signal shown in FIG. 3.

Referring to the drawings, wherein the reference characters designate like or corresponding parts throughout the views, FIG. 1 shows a block diagram of a typical tracking servo system 2 for a disc drive. The tracking servo system 2, comprises a analog to digital (A/D) converter 4, a coarse track seeking system 6, a normal tracking system 10, a digital-to-analog (D/A) converter 12 and a servo positioner 14.

The input of the A/D converter 4 receives an analog position signal on a line 16. The analog position signal is representative of the position of a controlled head (not shown) with respect to the tracks on a selected disc (not shown). This position signal may be derived from the output of the controlled head itself or another head that tracks a dedicated disc servo surface that has a position that corresponds to the position of the controlled head.

The A/D converter 4 converts the analog position signal to a digital position signal that is fed to respective inputs of the coarse track seeking system 6, and the normal tracking system 10 via a line 18. When the servo system 2 is in the normal tracking mode, the normal tracking system 10 has servo control of the servo system 2.

The normal tracking system 10 produces a digital servo control signal output that is fed to the D/A converter 12 via a line 20. The D/A converter 12 converts the digital servo control signal to an analog servo control signal that is fed to the servo positioner 14 via a line 22.

When another track is selected, servo control is passed from the normal tracking system to the coarse track seeking system 6. The coarse track seeking system 6 compares the present track position of the head derived from the digital position signal on the line 18 with the track position of the desired track.

It then produces a digital servo control signal on the line 20 that is converted by the D/A converter 12 to produce an analog servo control signal on the line 22. The analog servo control signal on the line 22 drives the servo positioner 14 to move the head toward the selected track with a velocity profile that is determined by the spacing between the original track and the selected track.

When the head is approximately positioned over the selected track by the coarse track seeking system 6, servo control is passed to the normal tracking system 10. The normal tracking system 10 monitors the digital track position signal on the line 18 to derive a position error signal that is indicative of the proximity of the head over the selected track.

A fine track seeking operation of the normal tracking system 10 requires that the head remain within a certain selected narrow proximity of the centerline of the selected track, as determined by the position error signal, for a certain selected period to declare the head to be on track. In the preferred embodiment, the normal tracking system 10 uses a primary proximity threshold of plus or minus 8.5 percent for this purpose as a reasonable compromise between head positioning accuracy and system stability. However, a greater or lesser degree of proximity for the primary proximity threshold can be used.

The normal tracking system 10 also monitors how long that the head remains within the primary proximity threshold. This period is conveniently measured in terms of the number of sectors on the selected track that the head remains within the primary proximity threshold.

An entrance period is stored by the normal tracking system 10 that corresponds to the selected head. Each head that is controlled by the normal tracking system 10 has its own corresponding entrance period stored in the normal tracking system 10.

Each entrance period that is initially stored in the normal tracking system 10 is empirically determined to represent the period necessary for the corresponding head to remain within the primary proximity threshold before the head is declared to be on track. When the head remains on track for the corresponding entrance period, the drive is allowed to read or write data. In the preferred embodiment, each entrance period is based upon the empirical determination of the average time required for the corresponding head to settle after being accurately positioned by the normal tracking system 10.

Different heads in the same disc drive typically have different entrance periods because they each require a different period to settle. This is because of the mechanical arrangement of the different heads on their corresponding actuator arm. For instance, heads that are positioned uppermost or lowermost in the disc drive are more likely to require a longer entrance period.

According to the present invention, each entrance period for each head is adaptively reduced or increased from the stored nominal value according to actual operation conditions. This is done by monitoring the performance of the fine track seeking operation for each head and modifying the corresponding entrance period accordingly.

In order to accurately determine if the stored entrance period is sufficient, the normal tracking system 10 monitors the deviation of the head from the centerline of the selected track after the head is declared to be on track. In the preferred embodiment, any deviation of the head beyond a selected proximity from the centerline of the selected track is detected. If such a deviation occurs, the normal tracking system 10 increments the stored entrance period by a selected amount, such as by the period corresponding to the duration of one track sector.

In the preferred embodiment, a secondary proximity threshold of plus or minus 15 percent is used for this purpose as a compromise between sensitivity to changes in operating conditions and optimum efficiency. If the secondary proximity threshold is too wide, the normal tracking system 10 will not adequately adapt the stored entrance period for the corresponding head to unstable positioning conditions. If it is too narrow, the fine track seeking system will extend the corresponding stored entrance period more than necessary and the overall track acquisition period will be greater than optimum.

In order to accurately determine if the stored entrance period is excessive, the normal tracking system 10 counts the number of consecutive "successful" entrances that are completed by the head. A "successful" entrance is considered a fine track seeking operation that is completed with no deviation of the head beyond the secondary proximity threshold.

After a selected number of consecutive successful entrances of the head on the selected track are counted, the normal tracking system 10 reduces the corresponding stored entrance period by a selected amount. In the preferred embodiment, a count of 30,000 successful entrances is used to decrement the corresponding entrance period by a period corresponding the duration of one track sector. A greater or lesser number of counts can be used, and the decrement of the corresponding stored entrance period can be a greater or lesser amount, depending on the parameters of the disc drive.

In this manner, the stored entrance period for each head is incremented and decremented according to the specific operating conditions. In the preferred embodiment, for each head entrance that allows a crossing of the head beyond the secondary proximity threshold after the head is declared on track, the stored entrance period is increased by the duration of one sector on the track. In this way, three consecutive entrances that allow the head to cross the secondary proximity threshold increases the initially stored entrance period by the duration of three sectors on the track.

Likewise, in the preferred embodiment, for each 30,000 consecutive entrances of the head without crossing the secondary proximity threshold the corresponding entrance period is decremented by the duration of one sector on the track. In this way, three groups of 30,000 consecutive entrances without the head crossing the secondary proximity threshold reduces the initially stored entrance period by the duration of three sectors on the track.

FIG. 2 is a flow chart of the procedure for adaptively changing the entrance criteria of the normal tracking system 10 in accordance with the present invention. The head is monitored by the normal tracking system 10. When the normal tracking system 10 detects that the head has remained within the primary proximity threshold of the selected track for the duration of the stored entrance period, it declares the head to be on track.

The normal tracking system 10 then monitors any crossing of the head beyond the secondary proximity threshold of the selected track. If the head crosses the secondary proximity threshold, the normal tracking system 10 increments the stored entrance period corresponding to the head by a preselected period, such as the duration of one track sector, and resets the count of successful head entrances to zero.

If the head does not cross the secondary proximity threshold after being declared on track, the entrance of the head is considered successful and a count of successful head entrances for the head is incremented by one. If the count of successful head entrances for the head then equals a preselected number, such as 30,000, the normal tracking system 10 decrements the stored entrance period corresponding to the head by a preselected period, such as the duration of one track sector, and resets the count of successful head entrances to zero.

Figure 3:
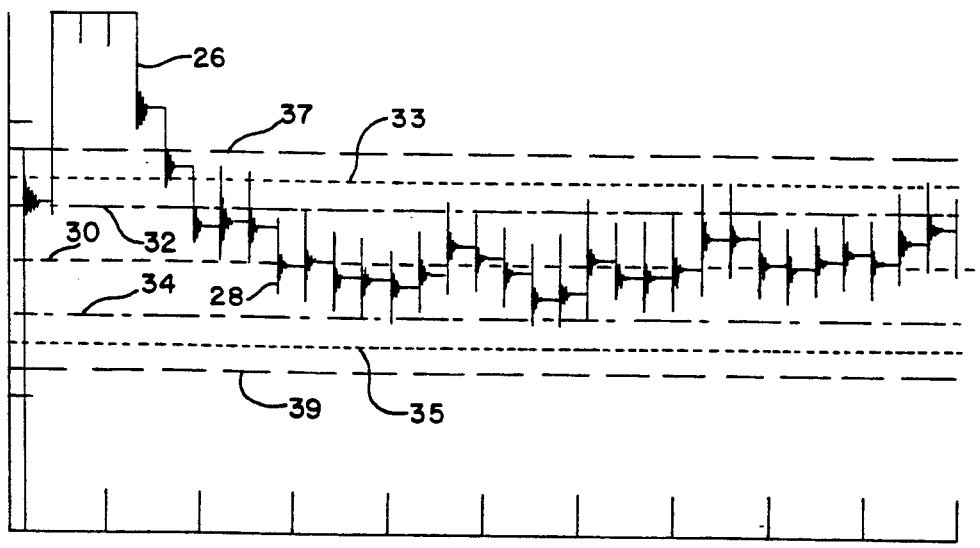
FIG. 3 is a graphical representation the analog position signal for a first example of a head entrance operation as a function of time.

FIG. 3 is a graphical representation of a position signal that is received by the A/D converter 4 on the line 16 in FIG. 1 for one example of a head entrance. This signal is converted to digital form and transmitted to the normal tracking system 10 on the line 18.

In FIG. 3, a line 26 represents the amplitude of the analog position signal as a function of time. A plurality of damped high frequency oscillations 28 that are superimposed on the analog position signal represent transitions of the head from one sector to another on the disc.

A predefined amplitude of the position signal represents the head to be tracking exactly over the centerline of the selected track. This is represented by the dashed line 30. Likewise, defined levels of the position signal represent the upper and lower trigger levels for the primary proximity threshold in the normal tracking system 10. The upper and lower trigger levels for the primary proximity threshold are represented by the dashed lines 32 and 34, respectively.

Defined levels of the position signal also represent the upper and lower trigger levels for the secondary proximity threshold in the normal tracking system 10. The upper and lower trigger levels for the secondary proximity threshold are represented by the dashed lines 33 and 35, respectively.

A deassertion threshold is used to represent a threshold proximity of the head from the centerline of the selected track beyond which servo control of the head by the normal tracking system 10 is terminated. In the preferred embodiment, a deassertion threshold of plus or minus 18 percent is used, although a greater or lesser value of deassertion threshold can be used, as long as it is greater than the value of the secondary proximity threshold. The upper and lower trigger levels of the deassertion threshold are indicated by the dashed lines 37 and 39, respectively, in FIG. 3.

When the position signal develops an amplitude that is between the upper trigger level 32 and the lower trigger level 34 for the duration corresponding to the stored entrance period for the head, the normal tracking system 10 asserts a fine track signal that indicates that the head is on track. Assertion of this signal represents that the head is then declared on track.

FIG. 4 is a graphical representation of the fine track signal corresponding to the position signal shown in FIG. 3. A line 36 represents the amplitude of the fine track signal as a function of time. The assertion of the fine track signal is shown to be at a transition point 38. The transition point 38 occurs after an entrance period that corresponds to the duration of five sectors after the amplitude of the position signal remains within the boundaries of the upper trigger level 32 and the lower trigger level 34 of the primary proximity threshold as shown in FIG. 3.

In FIG. 4, the fine track signal is asserted by the normal tracking system 10 at a transition point that corresponds to the duration of five sectors after the position signal remains within the boundaries of the upper trigger level 32 and the lower trigger level 34 of the primary proximity threshold.

The example shown in FIGS. 3 and 4 is representative of a successful head entrance, because the head remains within the boundaries of the upper trigger level 33 and the lower trigger level 35 of the secondary proximity threshold after the fine track signal is asserted by the normal tracking system 10. According to the preferred embodiment described above, 30,000 consecutive ones of such successful entrances would result in the fine track seeking system reducing the stored entrance period for the head from the duration of five sectors to four sectors.

FIG. 5 is a graphical representation of another example of head entrance, showing the resulting analog position signal on the line 16 in FIG. 1. A line 40 represents the amplitude of the analog position signal as a function of time. A plurality of damped high frequency oscillations 42 that are superimposed on the analog position signal represent transitions of the head from one sector to another on the disc.

A predefined amplitude of the position signal represents the head to be tracking exactly over the centerline of the selected track. This is represented by the dashed line 44. Likewise, defined levels of the position signal represent the upper and lower trigger levels for the primary proximity threshold in the normal tracking system 10. The upper and lower trigger levels for the primary proximity threshold are represented by the dashed lines 46 and 48, respectively.

When the position signal develops an amplitude that is between the upper trigger level 46 and the lower trigger level 48, the normal tracking system 10 asserts a fine track signal that indicates that the head is on track. Assertion of this signal represents that the head is then declared on track.

Also shown in FIG. 5 are upper and lower trigger levels for the secondary proximity threshold. The upper and lower trigger levels for the secondary proximity threshold are shown as the dashed lines 50 and 52, respectively. The upper and lower trigger levels for the deassertion threshold are represented by the dashed lines 51 and 53, respectively.

FIG. 6 is a graphical representation of the fine track signal corresponding to the position signal shown in FIG. 5. A line 54 represents the amplitude of the fine track signal as a function of time. The assertion of the fine track signal is shown to be after an entrance period that corresponds to the duration of five sectors after the amplitude of the position signal remains within the boundaries of the upper trigger level 46 and the lower trigger level 48 of the primary proximity threshold as shown in FIG. 5.

In FIG. 6, the fine track signal is asserted by the normal tracking system 10 at a transition point 56 that corresponds to the duration of six sectors after the position signal remains within the boundaries of the upper trigger level 46 and the lower trigger level 48 of the primary proximity threshold. The fine track signal is shown to start in the asserted state because the head had initially already been within the boundaries of the primary proximity threshold for a duration of at least six sectors.

In FIG. 5 it is evident that the head deviates past the upper trigger levels of both the secondary proximity and deassertion thresholds at a transition point 58. In the preferred embodiment of the present invention, this causes the normal tracking system 10 to deassert the fine track signal after the head deviates beyond the deassertion threshold for a duration of three sectors. This represents an off-track error.

Because the head deviates beyond the secondary proximity level for the duration of three sectors in a row, the normal tracking system 10 increments the stored entrance period that corresponds to the head by the duration of one sector. This example represents an unsuccessful head entrance that causes the stored entrance period for the head to be incremented and the off-track condition to be reported by the deassertion of the fine track signal.

FIG. 7 is a graphical representation of another example of head entrance, showing the resulting analog position signal on the line 16 in FIG. 1. A line 60 represents the amplitude of the analog position signal as a function of time. A plurality of damped high frequency oscillations 62 that are superimposed on the analog position signal represent transitions of the head from one sector to another on the disc.

A predefined amplitude of the position signal represents the head to be tracking exactly over the centerline of the selected track. This is represented by the dashed line 64. Likewise, defined levels of the position signal represent the upper and lower trigger levels for the primary proximity threshold in the normal tracking system 10. The upper and lower trigger levels for the primary proximity threshold are represented by the dashed lines 66 and 68, respectively.

When the position signal develops an amplitude that is between the upper trigger level 66 and the lower trigger level 68, the normal tracking system 10 asserts a fine track signal that indicates that the head is on track. Assertion of this signal represents that the head is then declared on track.

Also shown in FIG. 7 are upper and lower trigger levels for the secondary proximity threshold. The upper and lower trigger levels for the secondary proximity threshold are shown as the dashed lines 70 and 72, respectively. The upper and lower trigger levels for the deassertion threshold are represented by the dashed lines 71 and 73, respectively.

FIG. 8 is a graphical representation of the fine track signal corresponding to the position signal shown in FIG. 7. A line 74 represents the amplitude of the fine track signal as a function of time. The assertion of the fine track signal is shown to be after an entrance period that corresponds to the duration of five sectors after the amplitude of the position signal remains within the boundaries of the upper trigger level 66 and the lower trigger level 68 of the primary proximity threshold as shown in FIG. 7.

In FIG. 8, the fine track signal is asserted by the normal tracking system 10 at a transition point 76 that corresponds to the duration of five sectors after the position signal remains within the boundaries of the upper trigger level 66 and the lower trigger level 68 of the primary proximity threshold. The fine track signal is shown to start deasserted state.

In FIG. 7 it is evident that the head deviates past the lower trigger levels of the secondary proximity threshold at a transition point 78. In the preferred embodiment of the present invention, this deviation is sufficient to increment the stored entrance period corresponding to the head because the boundaries of the secondary proximity threshold have been crossed by the head.

The head deviates beyond the lower trigger level 73 of the deassertion threshold at a point 80. The deviation of the head beyond the boundaries of the deassertion threshold is only for a duration of two sectors. In the preferred embodiment of the present invention, the head must deviate beyond the boundaries of the deassertion threshold for the duration of three sectors or move for the deassertion of the fine track to occur. This example represents an entrance that is not successful and causes an increase in the duration of its stored entrance period, but no error is reported by the deassertion of the fine track signal.

Thus there has been described herein a method and apparatus for adaptively modifying entrance criteria individually for each head in a disc drive according to actual operating conditions with the use of stored entrance criteria for each head, an extra track proximity threshold and a successful entrance counter. It will be understood that various changes in the details and configurations of the preferred embodiment described above in order to explain the nature of the invention may be made by those skilled in the art within the principle and scope of the present invention as expressed in the appended claims.

What is claimed is:

1. A method of optimizing the seek time for at least one head in a disc drive system between an initial track and a selected one of a plurality of other tracks on at least one disc in said disc drive system, comprising the steps of:
    moving said head from said initial track to said selected track;
    declaring said head to be on track following the duration of an entrance period after said head crosses within a primary proximity threshold from the centerline of said selected track;
    increasing said entrance period when said head deviates more than a secondary proximity threshold from the centerline of said selected track that is wider than said primary proximity threshold; and
    decreasing said entrance period when said head does not deviate beyond said secondary proximity threshold for a selected number of consecutive on track declarations.

2. A method of optimizing the seek time for at least one head in a disc drive system as set forth in claim 1 wherein said step of increasing said entrance period occurs when said head deviates more than said secondary proximity threshold for predetermined period of time.

3. A method of optimizing the seek time for at least one head in a disc drive system between an initial track and a selected one of a plurality of other tracks on at least one disc in said disc drive system, comprising the steps of:
    moving said head from said initial track to said selected track;
    determining that said head is within a primary proximity threshold from the centerline of said selected track;
    determining when said head remains within said primary proximity threshold for an entrance period of time;
    declaring said head to be on track when said head remains within said primary proximity threshold for said entrance period of time;
    determining if said head exceeds a secondary proximity threshold from the centerline of said selected track, said secondary proximity threshold being wider than said primary proximity threshold;
    increasing said entrance period of time when said head exceeds said secondary proximity threshold;
    counting a number of consecutive on track decelerations;
    determining if said consecutive on track decelerations exceeds a predetermined number; and
    decreasing said entrance period of time if said consecutive on track decelerations exceeds said predetermined number.

4. A method of optimizing the seek time for at least one head in a disc drive system as set forth in claim 3 further comprising the step of determining if said head remains outside said second proximity threshold for a predetermined period of time; and wherein said step of increasing said entrance period of time occurs when said head exceeds said secondary proximity threshold for said predetermined period of time.

* * * * *